(12) United States Patent
Bechet et al.

(10) Patent No.: US 12,366,358 B2
(45) Date of Patent: Jul. 22, 2025

(54) FLAME-HOLDER DEVICE FOR A TURBOJET AFTERBURNER, COMPRISING THREE-BRANCHED ARMS

(71) Applicant: SAFRAN AIRCRAFT ENGINES, Paris (FR)

(72) Inventors: Clément Jean Henri Bechet, Moissy-Cramayel (FR); Emmanuel Jean André Greslin, Moissy-Cramayel (FR); Pierre André Gabriel Malbois, Moissy-Cramayel (FR); Christophe Pieussergues, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 69 days.

(21) Appl. No.: 18/555,913

(22) PCT Filed: Apr. 15, 2022

(86) PCT No.: PCT/FR2022/050715
§ 371 (c)(1),
(2) Date: Oct. 18, 2023

(87) PCT Pub. No.: WO2022/223915
PCT Pub. Date: Oct. 27, 2022

(65) Prior Publication Data
US 2024/0219028 A1    Jul. 4, 2024

(30) Foreign Application Priority Data

Apr. 19, 2021 (FR) ........................... 2103988

(51) Int. Cl.
*F23R 3/18* (2006.01)
*F02K 3/10* (2006.01)
*F23R 3/20* (2006.01)

(52) U.S. Cl.
CPC ................. *F23R 3/18* (2013.01); *F02K 3/10* (2013.01); *F23R 3/20* (2013.01)

(58) Field of Classification Search
None
See application file for complete search history.

(56) References Cited

U.S. PATENT DOCUMENTS

| 2,800,765 | A |   | 7/1957  | French et al. |
|-----------|---|---|---------|---------------|
| 3,210,928 | A |   | 10/1965 | Zelinski |
| 8,061,143 | B1 | * | 11/2011 | Maguire ................... F02K 3/10 60/749 |

FOREIGN PATENT DOCUMENTS

| FR | 2904684 A1 | 2/2008 |
| FR | 2909438 A1 | 6/2008 |

(Continued)

OTHER PUBLICATIONS

International Search Report for PCT/FR2022/050715 dated Jul. 27, 2022.
Written Opinion for PCT/FR2022/050715 dated Jul. 27, 2022.

*Primary Examiner* — Lorne E Meade
*Assistant Examiner* — Alyson Joan Harrington
(74) *Attorney, Agent, or Firm* — McDonald Hopkins LLC

(57) ABSTRACT

A flame-holder device for a turbojet afterburner comprises an annular row of flame-holder arms, each having an inner branch having a free end and another end, and two outer branches which extend from the other end and diverge from one another in a direction extending from the free end to the other end, such that the inner branch transitions radially outward into the two outer branches which diverge radially outward from one another in two opposing circumferential directions, thereby forming mutually approaching areas between consecutive flame-holder arms for enabling the flame to spread from arm to arm.

11 Claims, 4 Drawing Sheets

(56) References Cited

FOREIGN PATENT DOCUMENTS

JP 2017180938 A 10/2017
RU 205518 U1 7/2021

* cited by examiner

FLAME-HOLDER DEVICE FOR A TURBOJET AFTERBURNER, COMPRISING THREE-BRANCHED ARMS

CROSS-REFERENCE TO RELATED APPLICATIONS

This is the National Stage of PCT international application PCT/FR2022/050715, filed on Apr. 15, 2022, which claims the priority of French Patent Application No. 2103988, filed Apr. 19, 2021, both of which are incorporated herein by reference in their entireties.

TECHNICAL FIELD

The present invention relates to the field of turbojet engines intended for propelling aircraft and comprising an afterburner channel. It relates more particularly to a flame-holder device for afterburning, a rear turbojet-engine part comprising such a device, and a turbojet engine comprising such a rear part.

PRIOR ART

Turbojet engines of a known type, in particular intended for supersonic flight, comprise, in the rear part thereof, also referred to as the rear body, an afterburner channel, also referred to as a "reheat channel", wherein the flow of gas coming from the turbine can undergo new combustion by virtue of the oxygen remaining within it, before expanding in an ejection nozzle.

Fuel injection devices in the form of arms are in general arranged at the inlet of the combustion channel to vaporize fuel downstream in the direction of a flame-holder device intended to stabilize the flame in the afterburner channel.

Such a flame-holder device typically comprises an annular row of flame-holder arms extending radially, intended to promote radial propagation of the flame along each of the arms, and a flame-holder ring connecting them in pairs to promote circumferential propagation of the flame, from arm to arm.

Designing such a flame-holder device involves making a compromise between the ability of the device to best hold and stabilize the flame, and limiting the pressure drop caused by the obstruction of the afterburner channel by the device.

Such a flame-holder device helps in particular to define the temperature profile of the airflow at the inlet of the exhaust nozzle of the turbojet engine, i.e. at the outlet of the afterburner channel. However, it is desirable for this temperature profile to be as uniform as possible in order to maximize the performances of the turbojet engine.

In this context, there is a need for an improved flame-holder device.

DISCLOSURE OF THE INVENTION

For this purpose the invention proposes a flame-holder device for turbojet-engine afterburning, comprising an annular row of flame-holder arms distributed around an axis of the device and each comprising an inner branch having a free end and another end, opposite to the free end, and two outer branches that extend from the other end of the inner branch, diverging from each other in a direction extending from the free end to the other end of the inner branch, so that, for each of said flame-holder arms, the inner branch transitions radially outwards into the two outer branches, which diverge from each other radially outwards in two opposite circumferential directions so that the outer branches of the flame-holder arms constitute mutually approaching areas between consecutive flame-holder arms enabling an afterburner flame to propagate from arm to arm.

The configuration of the flame-holder arms thus enables them to ensure both the radial propagation and the circumferential propagation of the flame.

The flame-holder device thus offers an advantageous alternative to the known devices consisting of arms distant from each other connected by a flame-holder ring. Compared with such known devices, the flame-holder device according to the invention has better distribution in the transverse plane, which reduces obstruction while keeping the same performances as the known devices with regard to holding and stabilization of the flame, or increases these performances while keeping a moderate obstruction.

In particular, the fact for the outer branches to extend radially outwards makes it possible to spread the propagation of the flame in the transverse plane, whereas the propagation obtained with the flame-holder ring of the known devices tends to be concentrated in proximity to a given circumferential line.

In preferred embodiments of the invention, for at least one of the flame-holder arms and preferably for each of the flame-holder arms, the two outer arms are arranged on either side of a midplane of the inner arm.

In preferred embodiments of the invention, for at least one of the flame-holder arms and preferably for each of the flame-holder arms, the two outer branches form equal angles with the midplane of the inner branch.

In preferred embodiments of the invention, for at least one of the flame-holder arms and preferably for each of the flame-holder arms, the inner branch extends in a radial direction with respect to the axis of the device.

In preferred embodiments of the invention, the two outer branches of each of the flame-holder arms are a first branch and a second branch configured so that, for each of the flame-holder arms, an end face of the first branch faces a lateral face of the second branch of a flame-holder arm that precedes the flame-holder arms in question in a given direction of rotation around the axis of the device.

In preferred embodiments of the invention, the two outer branches of each of the flame-holder arms are a first branch and a second branch configured so that, for each of the flame-holder arms, a lateral face of the first branch faces a lateral face of the second branch of a flame-holder arm that precedes the flame-holder arm in question in a given direction of rotation about the axis of the device.

In preferred embodiments of the invention, at least some of the flame-holder arms comprise an air conduit arranged to circulate air radially inwards from at least one air inlet to at least one air outlet.

In preferred embodiments of the invention, at least some of the flame-holder arms comprise a fuel pipe arranged to circulate fuel radially inwards from at least one fuel inlet to at least one fuel outlet.

The invention also relates to a rear turbojet-engine part, comprising an afterburner channel, an afterburner-channel housing surrounding said channel, and at least one flame-holder device of the type described above, in which at least one of the outer branches of each of the flame-holder arms has a radially outer end connected to the afterburner-channel housing or to a flow-separation shroud arranged concentrically inside the afterburner-channel housing or to support arms extending radially inwards from the afterburner-channel housing.

Finally, the invention relates to a turbojet engine for an aircraft comprising a rear part of the type described above.

BRIEF DESCRIPTION OF THE DRAWINGS

The invention will be best understood, and other details, advantages and features thereof will emerge from the reading of the following description made by way of non-limitative example and with reference to the accompanying drawings, wherein.

In all these figures, identical references can designate identical or similar elements.

DETAILED DESCRIPTION OF PREFERRED EMBODIMENTS

Figure 1:
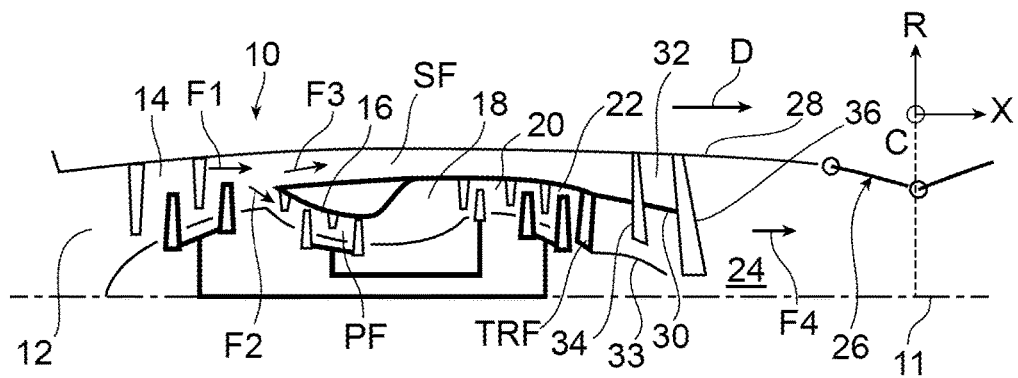
FIG. 1 is a schematic half-view in axial section of a turbojet engine comprising an afterburner channel.

FIG. 1 illustrates a turbojet engine 10, for example of the twin spool and bypass type, intended for example for propelling an aircraft suitable for supersonic flight, and therefore intended in particular to be installed in the fuselage of such an aircraft. The invention is of course applicable to other types of turbojet engine.

In this description, the axial direction X is the direction of the longitudinal axis 11 of the turbojet engine. Except when it is stipulated otherwise, the radial direction R is at every point a direction orthogonal to the longitudinal axis 11 and passing through it, and the circumferential direction C (sometimes called the azimuthal or orthoradial direction) is at every point a direction orthogonal to the radial direction R and to the longitudinal axis 11. The qualifiers "upstream" and "downstream" are defined with reference to a general direction D of flow of the gases in the turbojet engine 10.

By way of illustration, such a turbojet engine 10 comprises, from upstream to downstream, an air inlet 12, a low-pressure compressor 14, a high-pressure compressor 16, a combustion chamber 18, a high-pressure turbine 20, a low-pressure turbine 22, an afterburner channel 24, and a variable-geometry nozzle 26, for example of the convergent-divergent type. These turbojet-engine members are all centered on the longitudinal axis 11 thereof.

An afterburner-channel housing 28 surrounds said channel.

In addition, a flow-separation shroud 30, usually referred to as "confluence", extends downstream from a rear housing TRF of the low-pressure turbine 22, inside the housing 28, concentrically with the latter, so as to externally delimit the inlet of the afterburner channel 24 and to delimit, with the housing 28, an annular channel 32 forming the downstream end of the secondary duct SF.

Finally, a diffusion cone 33 extends downstream in line with a hub of the rear housing TRF of the low-pressure turbine 22, so as to internally delimit the inlet of the afterburner channel 24.

In a well known manner, the high-pressure compressor 16, the combustion chamber 18 and the high-pressure 20 and low-pressure 22 turbines define a primary duct PF. The latter is surrounded by a secondary duct SF of the turbine engine that extends from upstream to downstream, from an outlet of the low-pressure compressor 14 to a downstream end of the flow-separation shroud 30, and which therefore includes the aforementioned annular channel 32.

Thus, in operation, air F1 that has entered through the air inlet 12 and was compressed by the low-pressure compressor 14 next divides into a primary flow F2 that circulates in the primary duct PF and into a secondary flow F3 that circulates in the secondary duct SF. The primary flow F2 is then compressed further in the high-pressure compressor 16, and then mixed with fuel and ignited in the combustion chamber 18, before undergoing expansion in the high-pressure turbine 20 and then in the low-pressure turbine 22.

The combustion gases constituting the primary flow F2 discharged from the turbine and the secondary flow F3 mix in the afterburner channel 24 from the downstream end of the flow-separation shroud 30, and thus constitute a flow of exhaust gas F4 that continues its circulation in the afterburner channel 24 and then escapes from the turbojet engine 10 through the outlet delimited by the nozzle 26.

At operating speed with afterburning, for example for propelling an aircraft at supersonic speeds, fuel is injected into the gas flow in the afterburner channel 24, and the mixture thus formed is ignited in this channel in order to generate extra thrust.

For this purpose, fuel-injection devices 34 in the general form of arms are arranged at the inlet of the afterburner channel 24 to vaporize fuel downstream in the direction of a flame-holder device 36 intended to promote stabilization of the flames.

Figure 2:
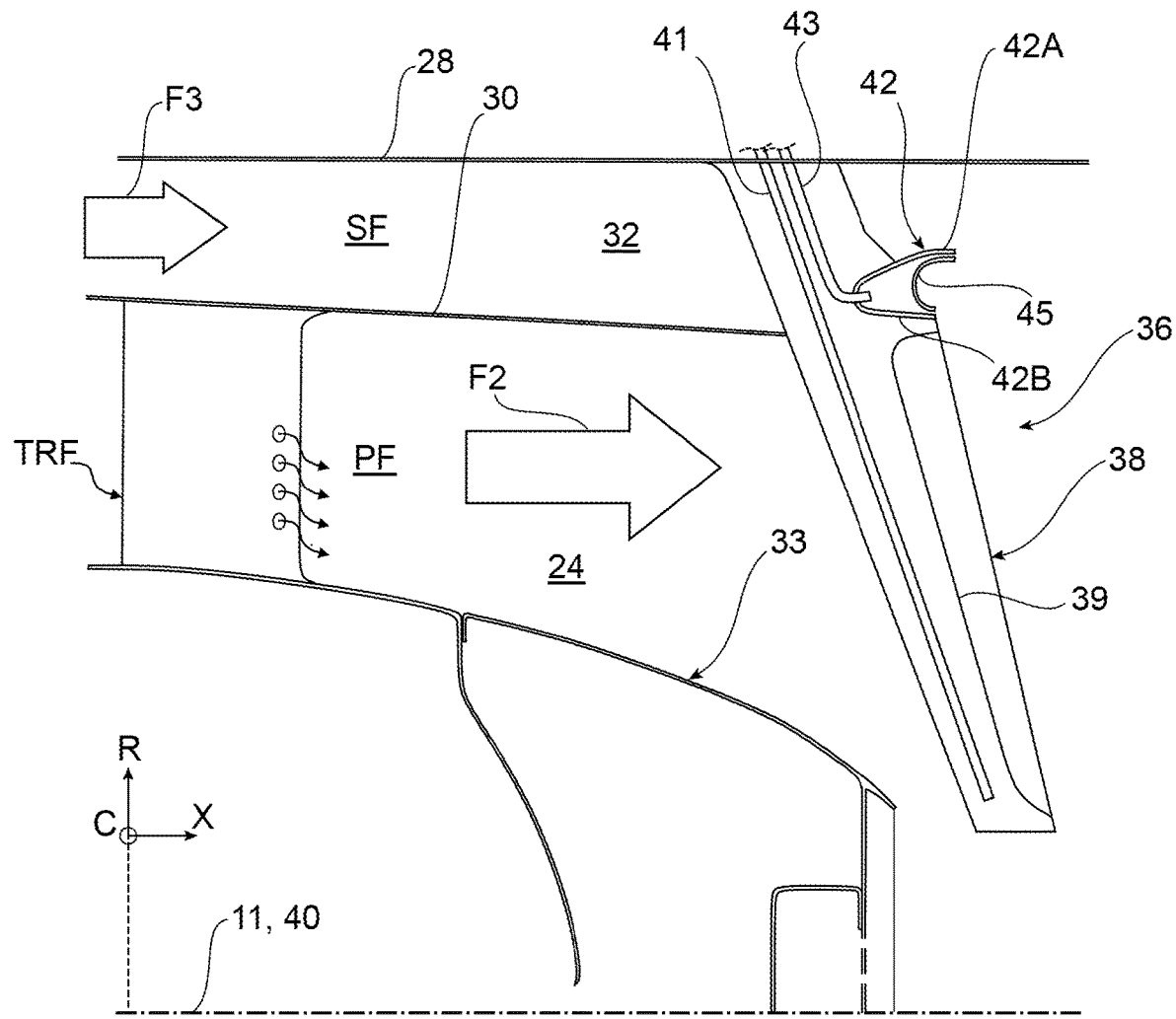
FIG. 2 is a schematic half-view in axial section of a turbojet engine rear part, comprising a flame-holder device of a known type.

FIG. 2 illustrates to a larger scale the rear part of such a turbojet engine, in a known configuration. This figure shows in particular the flame-holder device 36, which is also visible in front view on FIG. 3, and which comprises an annular row of flame-holder arms 38 extending radially with respect to an axis 40 of the device, which coincides with the longitudinal axis 11 of the turbojet engine, and a flame-holder ring 42 centered on the axis 11 and connecting the flame-holder arms 38 in pairs.

The flame-holder arms 38, for example nine in number, are intended to promote radial propagation of the flame along each of the arms, while the flame-holder ring 42 is intended to promote circumferential propagation of the flame, from arm to arm.

The flame-holder arms 38 are each connected to the afterburner-channel housing 28, from which these arms extend radially inwards.

In the example illustrated on FIG. 2, the flame-holder ring 42 is arranged at the downstream end of the annular channel 32 forming the downstream end of the secondary duct SF. In other known configurations, the flame-holder ring 42 is arranged inside the flow-separation shroud 30, in line with the primary duct PF.

Figure 3:
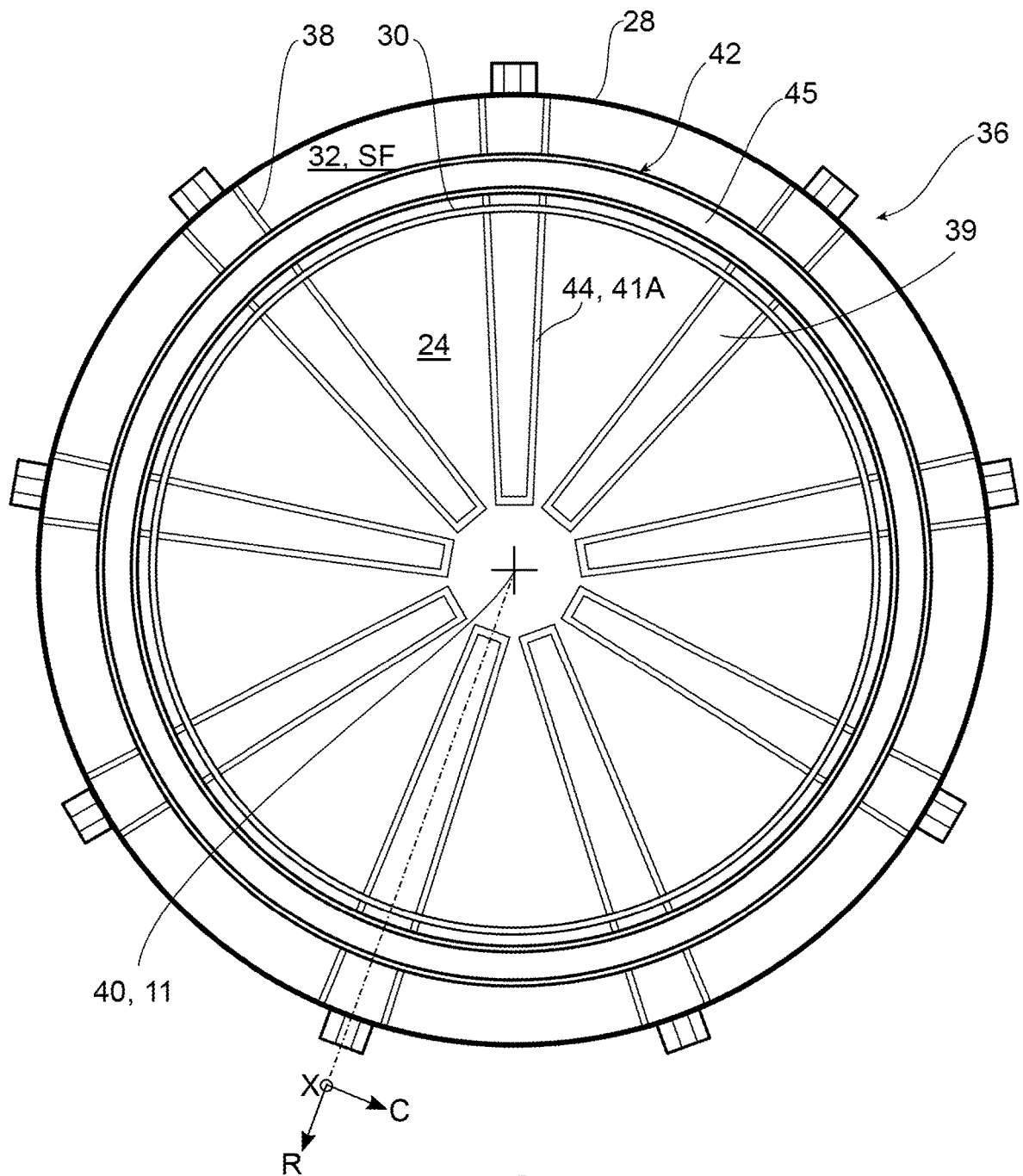
FIG. 3 is a schematic front view, from downstream, of the known flame-holder device of the turbojet engine rear part of FIG. 2.

The flame-holder arms 38 in general comprise means for circulating therein relatively cool air, coming from the secondary duct SF, in order to provide thermal protection of the flame-holder arms. For each of the arms, such means in general comprise one or more air inlets (not visible on the figures) emerging upstream in the secondary duct SF, air outlets 44 (FIG. 3) emerging downstream in the afterburner channel 24, and an internal duct connecting the air inlets to the air outlets. These arms each comprise for example a thermal protection device 39 (FIGS. 2 and 3) able to channel the cool air coming from the secondary duct, and delimiting the air outlets 44 (FIG. 3). In some cases, such as the example illustrated, the flame-holder arms 38 furthermore comprise fuel-injection means 41 (FIG. 2) comprising, for each arm, one or more fuel outlets 41A (FIG. 3). The air and fuel outlets may be the same, the mixing of air and fuel being able to be implemented within the flame-holder arms 38.

With reference to FIG. 2, the flame-holder ring 42 has a concave section in the downstream direction, roughly in a C or V shape, thus defining two branches 42A, 42B connected to each other on the upstream side, and having on the downstream side free ends that, in operation, promote the appearance of areas of recirculation of the gas flow, contributing to the stabilization of the flame. The flame-holder ring 42 in general also includes means for circulating within it cool air coming from the secondary duct SF and, in some cases, such as the example illustrated, fuel injection means 43. The flame-holder ring 42 typically includes a thermal-protection screen 45 arranged between the branches 42A 42B to channel the cool air coming from the secondary duct and thus to protect the ring 42 on the downstream side from the surrounding hot gases and from the thermal radiation of the flame.

The document FR 2909438 discloses an example of such a flame-holder device.

With such a flame-holder device, the inventors in particular determined that the flame-holder ring represents an obstruction the location of which is not optimal, and that the mean separation between the arms is unfavorable to self-maintenance of the flame.

Figure 4:
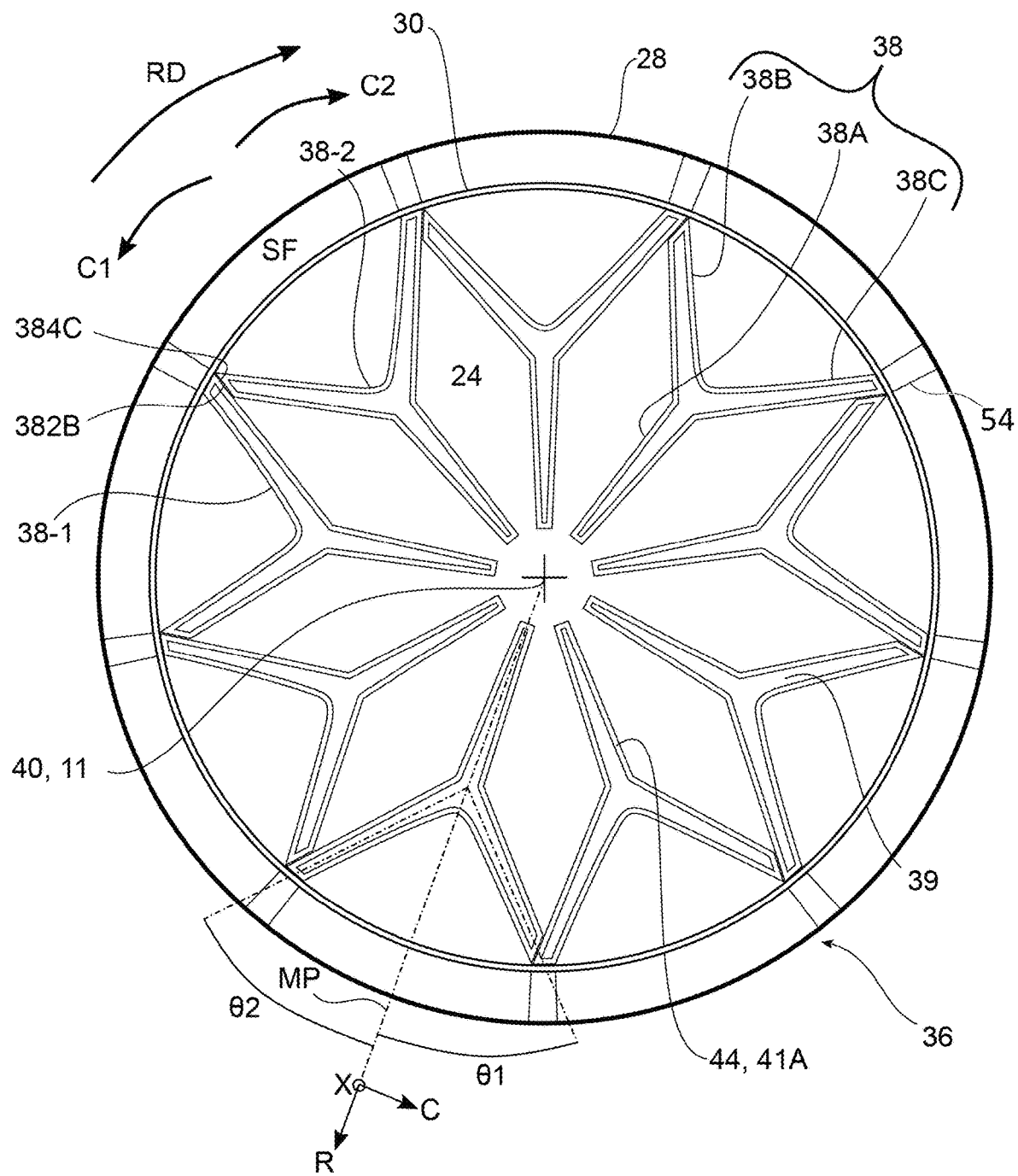
FIG. 4 is a schematic front view, from downstream, of a flame-holder device according to a preferred embodiment of the invention.

In order to remedy this problem, a flame-holder device 36 according to the invention comprises, with reference to FIG. 4, flame-holder arms 38 each comprising an inner branch 38A having a free end 50 and another end 52, opposite to the free end 50, and two outer branches 38B and 38C that extend from the other end 52 of the inner branch 38A, diverging from each other in a direction from the free end 50 towards the other end 52 of the inner branch. In such a flame-holder device 36, such a direction corresponds to the radial direction R for each of the flame-holder arms 38.

It must thus be understood that the arms 38 each have a roughly Y shape when the device is seen in cross section or from the front.

The flame-holder arms 38 are distributed around the axis 40 of the device so that, for each of the flame-holder arms, the inner branch 38A transitions radially outwards into the two outer branches 38B and 38C and so that these two outer branches 38B and 38C diverge from each other radially outward in two opposite circumferential directions C1 and C2.

The configuration of the flame-holder arms 38 enables them to provide both the radial propagation and the circumferential propagation of the flame. The configuration of the outer branches 38B and 38C in fact enables them to constitute mutual approaching areas between consecutive arms 38 enabling the flame to propagate from arm to arm. For this purpose, the radially outer ends of the outer branches 38B and 38C constitute maximum proximity areas between consecutive arms.

The device 36 consisting of the flame-holder arms 38 thus offers an advantageous alternative to the known devices consisting of radial arms and a flame-holder ring. Compared with the latter, the flame-holder device 36 according to the invention has better distribution in the transverse plane, which allows to reduce obstruction while keeping the same performances as the known devices with regard to flame holding and stabilization, or to increase these performances while keeping constant obstruction.

In particular, the fact that the outer branches 38B and 38C extend radially outward allows to spread the propagation of the flame in the transverse direction, whereas the propagation obtained with the flame-holder ring of the known devices tends to be concentrated in proximity to a given circumferential line.

Figure 5:
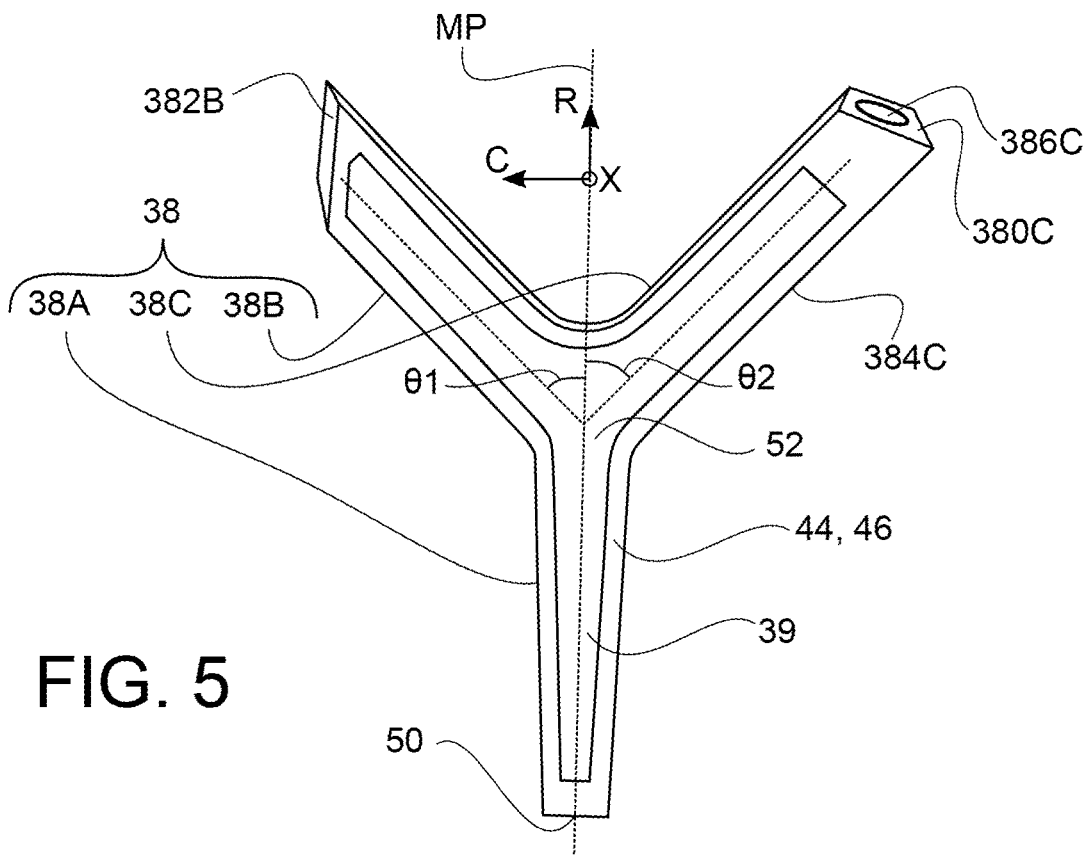
FIG. 5 is a schematic perspective view, from downstream, of a flame-holder arm of the device of FIG. 4.
Figure 6:
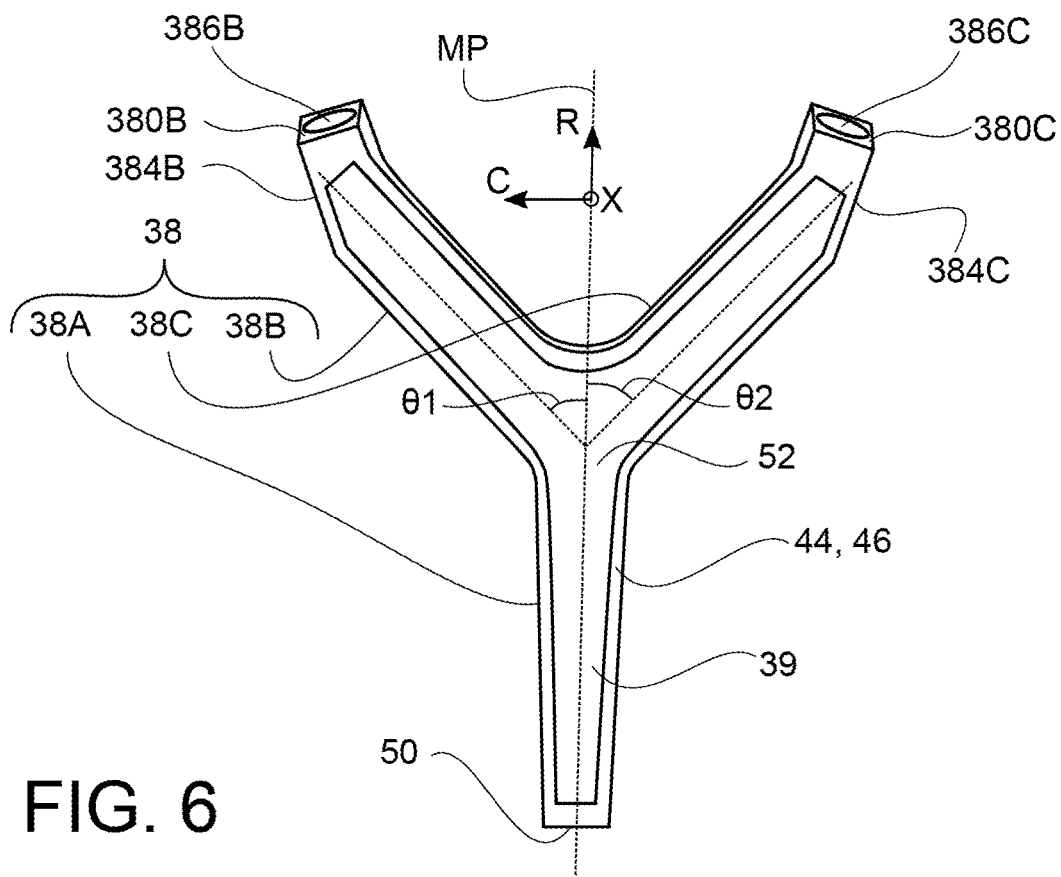
FIG. 6 is a schematic perspective view, from downstream, of a flame-holder arm according to a variant of the invention.

In general terms, as appears more clearly on FIGS. 5 and 6, the two outer branches 38B and 38C are advantageously arranged on either side of a midplane MP of the inner branch 38A, and form for example with said midplane MP equal angles $\theta 1$, $\theta 2$. In addition, the inner branch 38A advantageously extends in the radial direction R.

The general form of the arms 38 according to the invention as defined above does not however exclude the angles $\theta 1$, $\theta 2$ being different, or the inner branch 38A extending in a direction inclined with respect to the radial direction R, or one of the outer branches 38B or 38C extending in line with the inner branch 38A.

As will appear more clearly hereinafter, at least one of the outer branches 38B, 38C of each of the flame-holder arms has a radially outer end 380C connected to a corresponding support arm extending radially inward from the afterburner-channel housing 28. The connection between said radially outer end 380C and the corresponding support arm 54 is implemented for example through a corresponding orifice provided in the flow-separation shroud 30.

In a variant, said radially outer end 380C can be connected to the flow-separation shroud 30 or be connected directly to the afterburner-channel housing 28, for example in cases where the flame-holder device 36 is arranged downstream of such a flow-separation shroud 30.

Still with reference to FIG. 4, and with reference to FIG. 5, which illustrates one of the arms 38 of the device 36 of FIG. 4, the two outer branches of each of the flame-holder arms are a first branch 38B and a second branch 38C, which are configured so that, for each of the flame-holder arms (for example the arm 38-2 of FIG. 4), an end face 382B of the first branch extends facing a lateral face 384C of the second branch of a flame-holder arm (for example the arm 38-1) that precedes the flame-holder arm in question in a given direction of rotation RD about the axis 40 of the device. More precisely, the end face 382B of the first branch extends either in contact with the lateral face 384C of the second branch of the preceding arm, or at a short distance from it, so as to provide between these faces 382B, 384C a clearance allowing thermal expansions of the arms in operation.

The end face 382B of the first branch is therefore free to move with respect to the lateral face 384C of the second branch of the preceding arm.

In such a case, only the second branch 38C participates in the securing of the arm 38 to the afterburner-channel housing 28 (directly or indirectly) or, where applicable, to the flow-separation shroud 30.

The set of arms 38 is thus isostatic.

Like the arms 38 of the known device in FIG. 3, some or all of the flame-holder arms 38 of the device according to the invention advantageously comprise means for circulating within them cool air coming from the secondary duct SF.

With reference to FIG. 5, these means comprise an air inlet 386C emerging through the radially outer end 380C of the second branch 38C, to receive air taken from the secondary duct SF by the corresponding support arm 54. The latter includes for example for this purpose one or more orifices open upstream and an internal duct arranged to conduct the air coming from the orifice or orifices to a radially inner outlet connected to the air inlet 386C of the corresponding flame-holder arm 38.

Said means furthermore comprise air outlets 44 distributed along the branches 38A-38C of the arm (or, in a variant, along one or two of the branches) and emerging downstream in the afterburner channel 24, and an inner air duct (not visible on the figures) formed along the relevant branches so as to connect the air inlet 386C to the air outlets 44. In the example illustrated, the inner duct is therefore extended in the inner branch 38A and in the first branch 38B.

In addition, some or all of the flame-holder arms 38 of the device according to the invention advantageously comprise fuel-injection means, comprising an internal fuel pipe (not visible on the figures) terminating in one or more fuel outlets 46 emerging downstream in the afterburner channel 24. The air and fuel outlets can there also be merged, the mixing of air and fuel being able to be implemented in the flame-holder arms 38.

The arms 38 provided with fuel-injection means are preferably also provided with means for circulating cool air as described above so that they thermally protect the internal fuel pipe, both against the surrounding flow of hot gases and against the flame radiation.

FIG. 6 illustrates a variant embodiment wherein the two outer branches of each of the flame-holder arms 38 are a first branch 38B and a second branch 38C configured so that, for each of the flame-holder arms, a lateral face 384B of the first branch 38B extends facing a lateral face 384C of the second branch 38C of a flame-holder arm that precedes the flame-holder arm in question in the given direction of rotation RD. More precisely, the lateral face 384B of the first branch extends either in contact with the lateral face 384C of the second branch of the preceding arm, or at a short distance therefrom.

In such a case, the two outer branches 38B and 38C can each participate in securing the arm 38 to the afterburner-channel housing 28, directly, or indirectly by means of support arms such as the support arms 54 described above, or, where applicable, to the flow-separation shroud 30.

In addition, air inlets 386B and 386C can be provided respectively in the radially outer ends 380B, 380C to provide cool air to the air outlets 44.

In the embodiment illustrated, the arms 38 are regularly distributed around the axis 40 of the device. In a variant, according to the configuration of the rear part of the turbojet engine, it is possible for one or more of the arms 38 to have a different form from that of the other arms and/or for the spacings between consecutive arms 38 not to be all equal, without departing from the scope of the invention.

What is claimed is:

1. A flame-holder device for turbojet-engine afterburning, comprising an annular row of flame-holder arms distributed around an axis of the flame-holder device, each of the flame-holder arms comprising:
an inner branch having a free end and another end opposite to the free end, and first and second outer branches that extend from the another end of the inner branch, diverging from each other in a direction extending from the free end to the another end of the inner branch, so that, for each of said flame-holder arms, the inner branch transitions radially outwards into the first and second outer branches, which diverge from each other radially outwards in two opposite circumferential directions so that for each of said flame-holder arms, the first outer branch of one flame-holder arm of the flame-holder arms and the second outer branch of an adjacent flame-holder arm of the flame-holder arms constitute a mutually approaching area therebetween by means of which an afterburner flame can propagate from said one flame-holder arm to said adjacent flame-holder arm, wherein a radially outer end of the first outer branch of said one flame-holder arm contacts a radially outer end of the second outer branch of said adjacent flame-holder arm.

2. The flame-holder device according to claim 1, wherein, for at least one of the flame-holder arms, the first and second outer branches are arranged on either side of a midplane of the inner branch.

3. The flame-holder device according to claim 2, wherein, for at least one of the flame-holder arms, the first and second outer branches form equal angles ($\theta 1$, $\theta 2$) with the midplane of the inner branch.

4. The flame-holder device according to claim 1, wherein, for at least one of the flame-holder arms, the inner branch extends in a radial direction with respect to the axis of the flame-holder device.

5. The flame-holder device according to claim 1, wherein the first and second outer branches of each of the flame-holder arms are configured so that, for each of the flame-holder arms, an end face of the first outer branch of said one flame-holder arm faces a lateral face of the second outer branch of said adjacent flame-holder arm in one of said two opposite circumferential directions.

6. The flame-holder device according to claim 1, wherein the first and second outer branches of each of the flame-holder arms are configured so that, for each of the flame-holder arms, a lateral face of the first outer branch of said one flame-holder arm faces a lateral face of the second outer branch of said adjacent flame-holder arm in one of said two opposite circumferential directions.

7. The flame-holder device according to claim 1, wherein at least some of the flame-holder arms comprise at least one from:
an air conduit arranged to circulate air radially inwards from at least one air inlet to at least one air outlet; and
a fuel pipe arranged to circulate fuel radially inwards from at least one fuel inlet to at least one fuel outlet.

8. A rear turbo-jet engine part, comprising an afterburner channel, an afterburner-channel housing surrounding said afterburner channel, and at least one flame-holder device according to claim 1, in which the respective radially outer end of at least one of the first and second outer branches of each of the flame-holder arms is connected to the afterburner-channel housing or to a flow-separation shroud arranged concentrically inside the afterburner-channel housing or to support arms extending radially inwards from the afterburner-channel housing.

9. A turbojet engine for an aircraft, comprising a rear turbojet-engine part according to claim 8.

10. A flame-holder device for turbojet-engine afterburning, comprising an annular row of flame-holder arms distributed around an axis of the flame-holder device, each of the flame-holder arms comprising an inner branch having a free end and another end opposite to the free end, and first and second outer branches that extend from the another end of the inner branch, diverging from each other in a direction extending from the free end to the another end of the inner branch, so that, for each of said flame-holder arms, the inner branch transitions radially outwards into the first and second outer branches, which diverge from each other radially outwards in two opposite circumferential directions so that for each of said flame-holder arms, the first outer branch of one flame-holder arm of the flame-holder arms and the second outer branch of an adjacent flame-holder arm of the flame-holder arms constitute a mutually approaching area therebetween by means of which an afterburner flame can propagate from said one flame-holder arm to said adjacent flame-holder arm, and an end face of the first outer branch of said one flame-holder arm faces a lateral face of the second outer branch of said adjacent flame-holder arm in one of said two opposite circumferential directions.

11. A flame-holder device for turbojet-engine afterburning, comprising an annular row of flame-holder arms distributed around an axis of the flame-holder device, each of the flame-holder arms comprising an inner branch having a free end and another end opposite to the free end, and first and second outer branches that extend from the another end of the inner branch, diverging from each other in a direction extending from the free end to the another end of the inner branch, so that, for each of said flame-holder arms, the inner branch transitions radially outwards into the first and second outer branches, which diverge from each other radially outwards in two opposite circumferential directions so that for each of said flame-holder arms, the first outer branch of one flame-holder arm of the flame-holder arms and the second outer branch of an adjacent flame-holder arm of the flame-holder arms constitute a mutually approaching area therebetween by means of which an afterburner flame can propagate from said one flame-holder arm to said adjacent flame-holder arm, and a lateral face of the first outer branch of said one flame-holder arm extends in contact against a lateral face of the second outer branch of said adjacent flame-holder arm in one of said two opposite circumferential directions.

\* \* \* \* \*